United States Patent
Hirayama

(10) Patent No.: US 12,548,259 B2
(45) Date of Patent: Feb. 10, 2026

(54) SHAPE ANALYSIS APPARATUS, SHAPE ANALYSIS METHOD, AND NON-TRANSITORY COMPUTER-READABLE RECORDING MEDIUM FOR SHAPE ANALYSIS

(71) Applicant: Arum Incorporated, Ishikawa (JP)

(72) Inventor: Takayuki Hirayama, Ishikawa (JP)

(73) Assignee: Arum Incorporated, Ishikawa (JP)

( * ) Notice: Subject to any disclaimer, the term of this patent is extended or adjusted under 35 U.S.C. 154(b) by 433 days.

(21) Appl. No.: 18/170,537

(22) Filed: Feb. 17, 2023

(65) Prior Publication Data

US 2023/0281928 A1   Sep. 7, 2023

(30) Foreign Application Priority Data

Mar. 2, 2022   (JP) ................... 2022-031385

(51) Int. Cl.
G06T 17/20   (2006.01)
G06T 7/13    (2017.01)
(Continued)

(52) U.S. Cl.
CPC .............. G06T 17/205 (2013.01); G06T 7/13 (2017.01); G06T 7/50 (2017.01); G06T 15/10 (2013.01); G06T 2210/36 (2013.01)

(58) Field of Classification Search
CPC .. G06T 7/13; G06T 15/10; G06T 7/50; G06T 2210/36; G06T 17/205; B33Y 50/00
See application file for complete search history.

(56) References Cited

U.S. PATENT DOCUMENTS 6,476,804 B1 * 11/2002 Costabel ................. G06T 13/20
                                                    345/646
9,773,331 B2 *  9/2017 Kaminski ............... G06T 11/40
(Continued)

FOREIGN PATENT DOCUMENTS

JP       2021-179861 A    11/2021

OTHER PUBLICATIONS

Salinas, D., et al., "Structure-Aware Mesh Decimation", Computer Graphics Forum: Journal of the European Association for Computer Graphics, vol. 34, No. 6, pp. 211-227, Feb. 26, 2015 (17 pages).
(Continued)

*Primary Examiner* — Phi Hoang
(74) *Attorney, Agent, or Firm* — Osha Bergman Watanabe & Burton LLP

(57) ABSTRACT

A shape analysis apparatus includes an obtaining unit configured to obtain mesh data representing a shape of an object, using a plurality of triangular meshes; a processing unit configured to perform processing of: merging two of the plurality of triangular meshes together, the two triangular meshes sharing one edge, and a difference in orientation being within a certain range between normal vectors of the two triangular meshes; and repeatedly merging a triangular mesh included in the plurality of triangular meshes, the triangular mesh sharing one edge with the merged meshes, and a difference in orientation being within a certain range between normal vectors of the triangular mesh and the merged meshes; and an analyzing unit configured to analyze shape data representing the shape of the object, in accordance with a result of the processing performed by the processing unit.

7 Claims, 13 Drawing Sheets

(51) Int. Cl.
   *G06T 7/50*      (2017.01)
   *G06T 15/10*     (2011.01)

(56) References Cited

U.S. PATENT DOCUMENTS

| | | | | |
|---|---|---|---|---|
| 2009/0184956 | A1* | 7/2009 | Kim | G06T 9/20 |
| | | | | 345/420 |
| 2011/0074779 | A1* | 3/2011 | Voth | G06T 17/20 |
| | | | | 345/420 |
| 2017/0169608 | A1* | 6/2017 | Starhill | G06T 15/04 |
| 2020/0312023 | A1* | 10/2020 | Min | G06T 15/503 |
| 2021/0174585 | A1* | 6/2021 | Huber | G06N 3/08 |
| 2022/0020214 | A1* | 1/2022 | Joris | G06T 17/20 |

OTHER PUBLICATIONS

Chen, Zhuo, et al., "Structure-Preserving Mesh Simplification", KSII Transactions on Internet and Information Systems, vol. 14, No. 11, pp. 4463-4482, Nov. 2020 (20 pages).
Hinker, Paul, et al., "Geometric Optimization", Visualization 2001, IEEE Computer Society Press, pp. 189-195, Oct. 25, 1993 (8 pages).
Muntoni, Alessandro, et al., "Mill and fold: Shape simplification for fabrication", Computers & Graphics, vol. 80, pp. 17-28, May 2019 (12 pages).
Saha, Somrita; Biswas, Arindam. "Surface polygonization of 3D objects using norm similarity," Journal of Combinatorial Optimization, vol. 44, pp. 2729-2747 (2022). (19 pages).

* cited by examiner

SHAPE ANALYSIS APPARATUS, SHAPE ANALYSIS METHOD, AND NON-TRANSITORY COMPUTER-READABLE RECORDING MEDIUM FOR SHAPE ANALYSIS

CROSS-REFERENCE TO RELATED APPLICATION

The present application claims priority from Japanese Application JP 2022-31385 filed on Mar. 2, 2022, the content to which is hereby incorporated by reference into this application.

BACKGROUND OF THE INVENTION

1. Field of the Invention

The present invention relates to a shape analysis apparatus, a shape analysis method, and a non-transitory computer-readable recording medium for shape analysis.

2. Description of the Related Art

Japanese Unexamined Patent Application Publication No. 2021-179861 discloses a technique to analyze a shape of an object, in accordance with Standard Triangulated Language (STL) data.

SUMMARY OF THE INVENTION

Mesh data including the STL data represents a shape of an object, using a plurality of triangular meshes. The more the number of triangular meshes is to represent the shape of the object, the longer the required time period is to analyze the shape of the object.

An aspect of the present disclosure is intended to provide, for example, a shape analysis apparatus that can reduce a time period for analyzing a shape of an object from mesh data.

In one or more embodiments of the present invention, a shape analysis apparatus including an obtaining unit configured to obtain mesh data representing a shape of an object, using a plurality of triangular meshes, a processing unit configured to perform processing of: merging two of the plurality of triangular meshes together, the two triangular meshes sharing one edge, and a difference in orientation being within a certain range between normal vectors of the two triangular meshes; and repeatedly merging a triangular mesh included in the plurality of triangular meshes, the triangular mesh sharing one edge with the merged meshes, and a difference in orientation being within a certain range between normal vectors of the triangular mesh and the merged meshes, and an analyzing unit configured to analyze shape data representing the shape of the object, in accordance with a result of the processing performed by the processing unit.

In one or more embodiments of the present invention, a shape analysis method processing of which is executed by a computer, the shape analysis method including obtaining mesh data representing a shape of an object, using a plurality of triangular meshes, performing processing of: merging two of the plurality of triangular meshes together, the two triangular meshes sharing one edge, and a difference in orientation being within a certain range between normal vectors of the two triangular meshes; and repeatedly merging a triangular mesh included in the plurality of triangular meshes, the triangular mesh sharing one edge with the merged meshes, and a difference in orientation being within a certain range between normal vectors of the triangular mesh and the merged meshes, and analyzing shape data representing the shape of the object, in accordance with a result of the processing of the repeated merger.

In one or more embodiments of the present invention, a non-transitory computer-readable storage medium, for shape analysis, causing a computer to execute processing of: obtaining mesh data representing a shape of an object, using a plurality of triangular meshes. performing processing of: merging two of the plurality of triangular meshes together, the two triangular meshes sharing one edge, and a difference in orientation being within a certain range between normal vectors of the two triangular meshes; and repeatedly merging a triangular mesh included in the plurality of triangular meshes, the triangular mesh sharing one edge with the merged meshes, and a difference in orientation being within a certain range between normal vectors of the triangular mesh and the merged meshes; and analyzing shape data representing the shape of the object, in accordance with a result of the processing of the repeated merger.

DETAILED DESCRIPTION OF THE INVENTION

Described below is an embodiment, with reference to the drawings. Like reference signs designate identical or corresponding constituent features throughout the drawings. Such constituent features will not be repeatedly elaborated upon.

Note that the embodiment described below shall not unreasonably limit the features recited in the claims. Moreover, not all the features described in this embodiment are essential features of the present disclosure.

Figure 1:
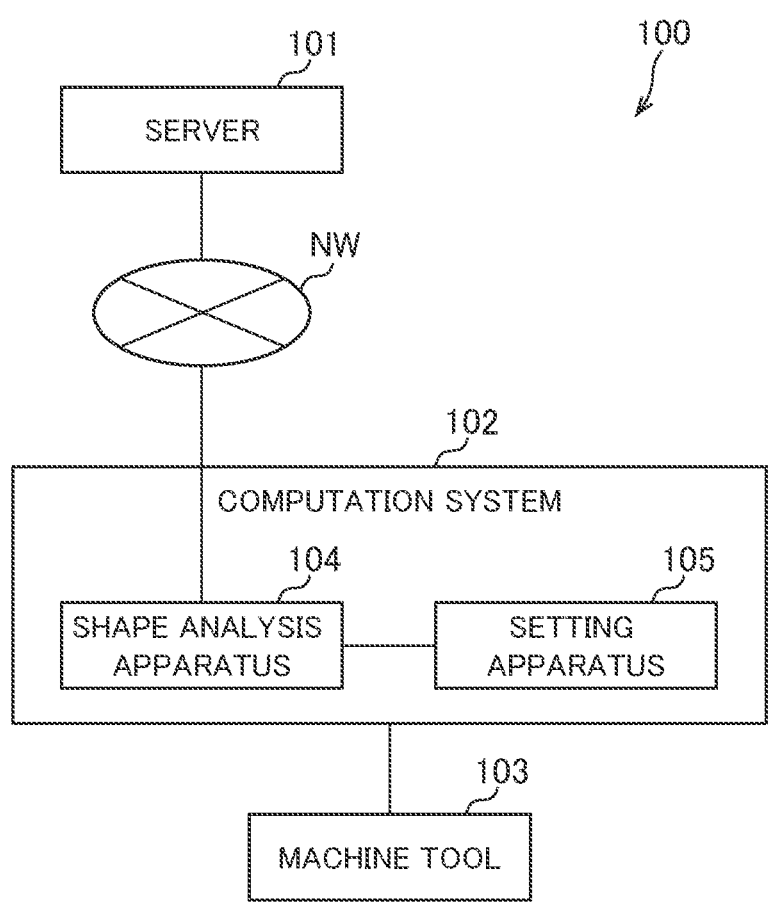
FIG. 1 is a diagram illustrating an example of a cutting control system.

FIG. 1 is a diagram illustrating an example of a cutting control system 100. The cutting control system 100 includes: a server 101; a computing system 102; and a machine tool 103. The computing system 102 includes: a shape analysis apparatus 104; and a setting apparatus 105. The server 101 and the shape analysis apparatus 104 are connected together through a network NW such as the Internet.

FIG. 1 shows an example in which the shape analysis apparatus 104 and the setting apparatus 105 are separate apparatuses. However, the shape analysis apparatus 104 and the setting apparatus 105 may be merged into a single apparatus. Moreover, the shape analysis apparatus 104 may be used either for a system other than the cutting control system 100, or as a single apparatus.

The server 101 stores mesh data to be described later. The server 101 is installed in a predetermined place by, for example, a company to provide the cutting control system 100.

The computing system 102 is a computer to control the machine tool 103. The machine tool 103 is a numerical control (NC) machine tool to process an object to be processed (hereinafter referred to as an object), in accordance with, for example, control from the computing system 102.

The shape analysis apparatus 104 obtains the mesh data from the server 101 through the network NW. The mesh data is drawing data representing a shape of the object, using a plurality of triangular meshes. In this embodiment, the mesh data is STL data. Alternatively, the mesh data may be any given drawing data other than the STL data. The mesh data represents a three-dimensional shape of the object.

The shape analysis apparatus 104 analyzes the shape of the object from the mesh data. The shape analysis apparatus 104 outputs, to the setting apparatus 105, the data representing the analyzed shape of the object in a form of analyzed data. The shape analysis apparatus 104 will be described later in details.

The setting apparatus 105 determines various settings for the machine tool 103 to process the object. For example, the setting apparatus 105 determines various settings such as selecting a processing type and a tool, in accordance with the analyzed data output by the shape analysis apparatus 104.

As to the setting of a processing type, the processing type is included in such processing types as, for example, island processing that leaves a shape of an island, blind hole processing that forms a blind hole, and through hole processing that forms a through hole. As to the setting of a tool, the tool is included in such tools as for example, a center drill and a square-end mill.

In the example of FIG. 1, the shape analysis apparatus 104 may obtain the mesh data from either the server 101 through the network NW, or such a memory as a portable memory. For example, if the shape analysis apparatus 104 is a single apparatus not connected to the network NW, the shape analysis apparatus 104 may obtain the mesh data from the portable memory holding the mesh data.

Figure 2:
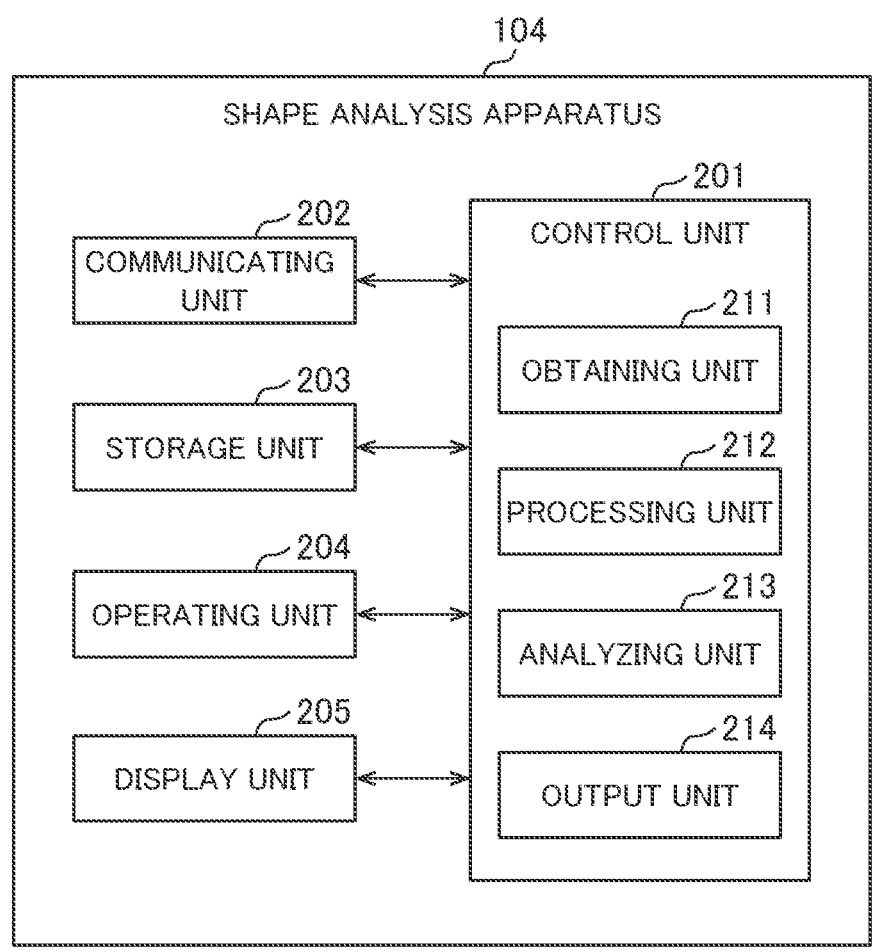
FIG. 2 is a block diagram illustrating an example of a shape analysis apparatus.

FIG. 2 is a block diagram illustrating an example of the shape analysis apparatus 104. The shape analysis apparatus 104 includes: a control unit 201; a communicating unit 202; a storage unit 203; an operating unit 204; and a display unit 205. The shape analysis apparatus 104 shall not be limited to the configuration in FIG. 2. The shape analysis apparatus 104 may either include another constituent feature, or omit some of the constituent features. The control unit 201 includes a processor and a memory. The processor of the control unit 201 may be any given processors such as a central processing unit (CPU) and a graphics processing unit (GPU).

The communicating unit 202 is a network interface connected to the network NW. In accordance with an instruction from the control unit 201, the communicating unit 202 transmits and receives information through the network NW. In this embodiment, the information includes the mesh data.

The storage unit 203 is, for example, such an information recording medium as a hard disk, a ROM, or a RAM. The storage unit 203 is an information recording medium to hold a program to be executed on a processor of the control unit 201.

The operating unit 204 is, for example, such an interface as a keyboard, a mouse, and a button. In accordance with a command operation from a user, the operating unit 204 outputs a detail of the command operation to the control unit 201. The display unit 205 is, for example, such a display as a liquid crystal display, a CRT display, or an organic EL display. In accordance with an instruction from the control unit 201, the display unit 205 displays information.

The control unit 201 includes: an obtaining unit 211; a processing unit 212; an analyzing unit 213; and an output unit 214. Each of the units is implemented in a form of software when the above processor executes a plurality of instruction sets stored in the memory.

The obtaining unit 211 obtains the mesh data from the server 101 through the communicating unit 202. The processing unit 212 performs various kinds of processing, in this embodiment, on the obtained mesh data. The analyzing unit 213 analyzes the shape of the object on the basis of the mesh data processed by the processing unit 212. The output unit 214 outputs the analyzed data to, for example, the setting apparatus 105. The analyzed data represents the analyzed shape of the object.

Figure 3:
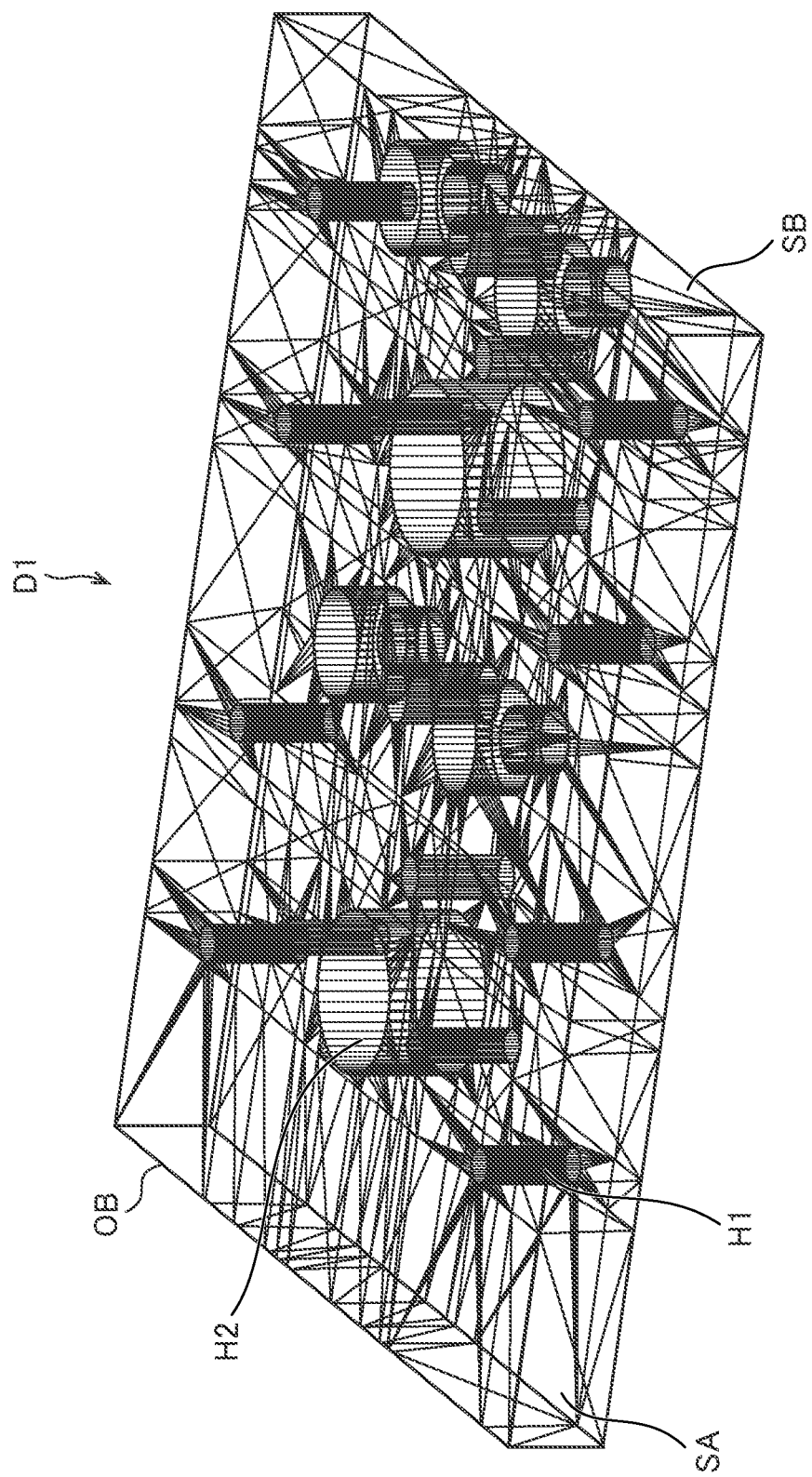
FIG. 3 is an exemplary view of mesh data before processing.

FIG. 3 is an exemplary view of mesh data before processing. The mesh data is data before processing by the processing unit 212; that is, STL data to be obtained from the server 101. As to the exemplary mesh data in FIG. 3, an object OB is shaped into a cuboid including a plane SA and a plane SB. The object OB has a plurality of holes including a hole H1 and a hole H2 (e.g., holes such as a blind hole and a through hole).

As seen in the example of FIG. 3, the mesh data represents a shape of the object OB, using a group of many triangular meshes. The mesh data includes information on many triangular meshes other than information on such shapes as an outline and the holes of the object OB. Hence, when the shape of the object OB is analyzed from the mesh data, much time is required for processing. Hence, in this embodiment, the edges of the plurality of triangular meshes are deleted, and the meshes are merged together. Such processing is repeatedly performed to delete information on the edges of the triangular meshes.

Figure 4A:
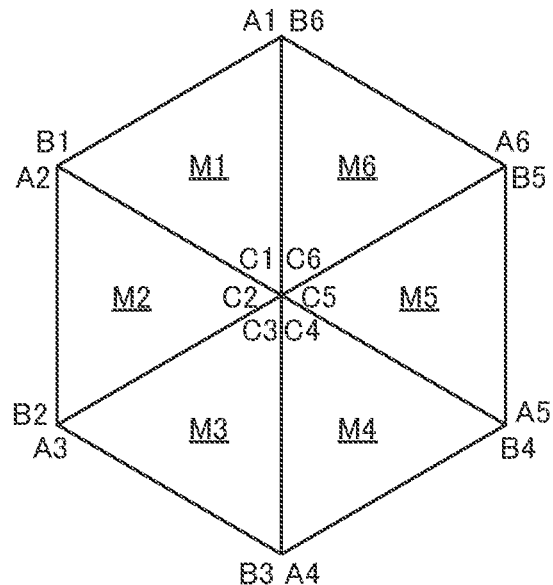
FIG. 4A is an exemplary view of six triangular meshes.

FIGS. 4A to 7B are exemplary views of merging meshes. FIG. 4A is an exemplary view of six triangular meshes M1 to M6. In FIG. 4A, the six triangular meshes M1 to M6 partially represent the mesh data obtained from the server 101 by the obtaining unit 211.

The STL data includes information on coordinates of three vertices of each of the triangular meshes and information on a normal vector of each of the triangular meshes. The processing unit 212 extracts the three vertices and the normal vector of each of the triangular meshes M1 to M6.

Each of the vertices is indicated by coordinate axes representing three dimensions of the X-coordinate, the Y-coordinate, and the Z-coordinate.

The processing unit 212 counterclockwise arranges all the three vertices of each of the triangular meshes M1 to M6. For example, in FIG. 4A, the processing unit 212 arranges three vertices A1, C1, and B1 of the triangular mesh M1 in the stated order. The same applies to the other triangular meshes M2 to M6.

The processing unit 212 defines three vectors counterclockwise connecting three vertices for each of the triangular meshes M1 to M6. For example, for the triangular mesh M1, the processing unit 212 defines: a vector from the vertex A1 to the vertex B1; a vector from the vertex B1 to the vertex C1; and a vector from the vertex C1 to the vertex A1. The processing unit 212 equally defines each of the vectors of the other triangular meshes M2 to M6.

If two of the triangular meshes share an edge, and a difference in orientation is within a certain range between normal vectors of the two triangular meshes, the processing unit 212 deletes the edge shared between the two triangular meshes, and merges the two triangular meshes.

Figure 4B:
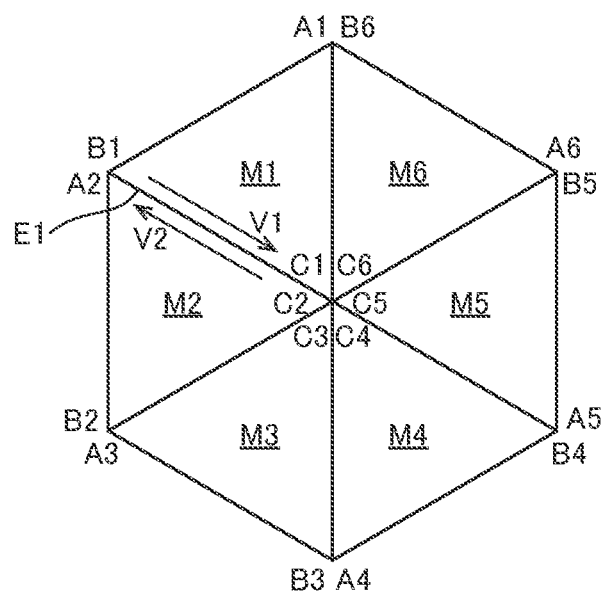
FIG. 4B is an exemplary view of triangular meshes in FIG. 4A with vectors defined.

FIG. 4B is an exemplary view of triangular meshes in FIG. 4A with vectors defined. FIG. 4B illustrates: a vector V1 from the vertex B1 to the vertex C1 of the triangular mesh M1; and a vector V2 from a vertex C2 to a vertex A2 of the triangular mesh M2.

The vertices B1 and A2 have the same coordinates, and the vertices C1 and C2 have the same coordinates. That is, the starting point of the vector V1 is the same as the ending point of the vector V2, and the ending point of the vector V1 is the same as the starting point of the vector V2. Moreover, the vector V1 and the vector V2 are oriented in opposite directions. In such a case, the processing unit 212 determines that the triangular mesh M1 and the triangular mesh M2 share an edge E1 on which the vector V1 and the vector V2 overlap with each other.

Moreover, information on an orientation of the normal vector of the triangular mesh M1 and information on an orientation of the normal vector of the triangular mesh M2 are previously obtained on the basis of the STL data. The processing unit 212 determines whether a difference is within a certain range between the orientation of the normal vector of the triangular mesh M1 and the orientation of the normal vector of the triangular mesh M2.

The above certain range can be set to any given range. For example, in the above certain range, the two triangular meshes are either on the same plane, or tolerably on the same plane. For example, when slightly curved faces can be interpreted as a single plane, even if orientations are not completely the same between normal vectors of two triangular meshes included in the curved faces, the processing unit 212 determines that a difference in orientation is within the certain range between the normal vectors of the two triangular meshes.

The difference is assumed to be within a certain range between the orientation of the normal vector of the triangular mesh M1 and the orientation of the normal vector of the triangular mesh M2. In such a case, the triangular mesh M1 and the triangular mesh M2 share the edge E1, and the difference in orientation is within the certain range between the normal vectors of the triangular meshes M1 and M2. Hence, the processing unit 212 deletes the edge E1, and merges the triangular mesh M1 and the triangular mesh M2 together.

Figure 5A:
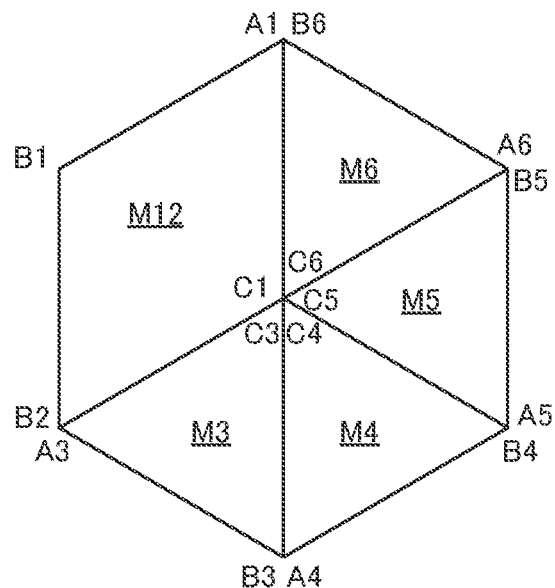
FIG. 5A is an exemplary view showing that two of the triangular meshes in FIG. 4B are merged.

FIG. 5A is an exemplary view showing that two of the triangular meshes in FIG. 4B are merged together. The processing unit 212, as described above, merges the triangular mesh M1 and the triangular mesh M2 together. Hereinafter, a mesh into which meshes are merged is referred to as a merged mesh. From a merged mesh M12, information on the edge E1 is deleted.

As described above, two triangular meshes are merged together, even if the orientations are not completely the same between the normal vectors of the two triangular meshes, and if the difference in orientation is within a certain range between the normal vectors. In such a case, the processing unit 212 defines a normal vector of a merged mesh as an average of the normal vectors of the two triangular meshes before the merger. The same applies to a case to be described later where a triangular mesh is merged into the merged mesh.

In this embodiment, the merged mesh includes two kinds of meshes: a mesh into which two triangular meshes are merged; and a mesh formed of a merged mesh and another triangular mesh additionally merged into the merged mesh. Either merged mesh is a polygonal mesh having four or more edges.

If there is a triangular mesh that shares an edge with a merged mesh and that has a normal vector whose orientation is within a certain range, the processing unit 212 deletes the edge shared between both of the meshes and merges the triangular mesh into the merged mesh.

Figure 5B:
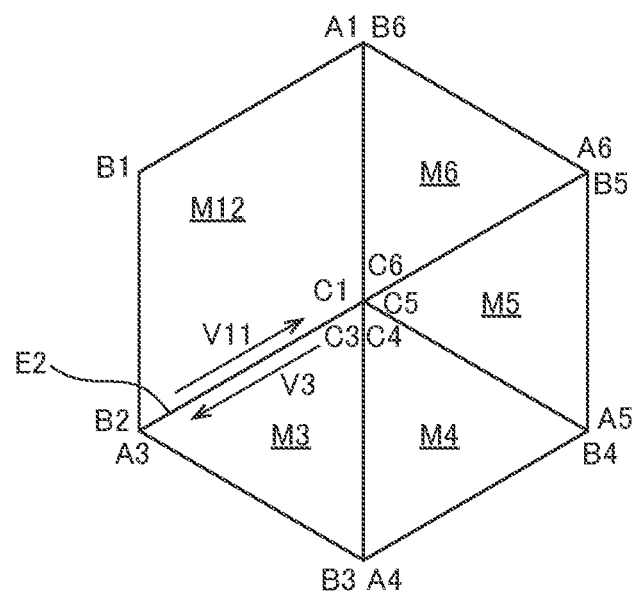
FIG. 5B is an exemplary view of meshes in FIG. 5A with victors defined.

FIG. 5B is an exemplary view of meshes in FIG. 5A with victors defined. As shown in the example of FIG. 5B, a vector is defined for each of four edges of the mesh M12 shaped into a rectangle. For example, a vector V11 connecting the vertex B2 and the vertex C1 together is a vector originally defined for the triangular mesh M2.

A vector V3 of a triangular mesh M3 is a vector connecting a vertex C3 and a vertex A3 together. The starting point of the vector V11 is the same as the ending point of the vector V3, and the vector V11 and the vector V3 are oriented in opposite directions. Moreover, the difference is assumed to be within a certain range between the orientation of the normal vector of the merged mesh M12 and the orientation of the normal vector of the triangular mesh M3.

Figure 6A:
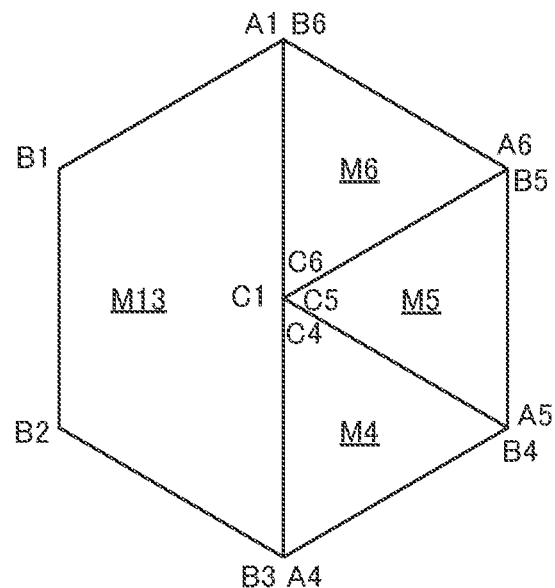
FIG. 6A is an exemplary view showing that a triangular mesh is merged into the merged mesh in FIG. 6B is an exemplary view of a triangular mesh in FIG. 6A with a vector defined.

The processing unit 212 deletes an edge E2 on which the vector V12 and the vector V3 overlap with each other, and merges the merged mesh M12 and the triangular mesh M3 together. Hence, the triangular mesh M3 is merged into the merged mesh M12, and another merged mesh is obtained. FIG. 6A is an exemplary view showing that a triangular mesh is merged into the merged mesh in FIG. 5B.

Figure 6B:
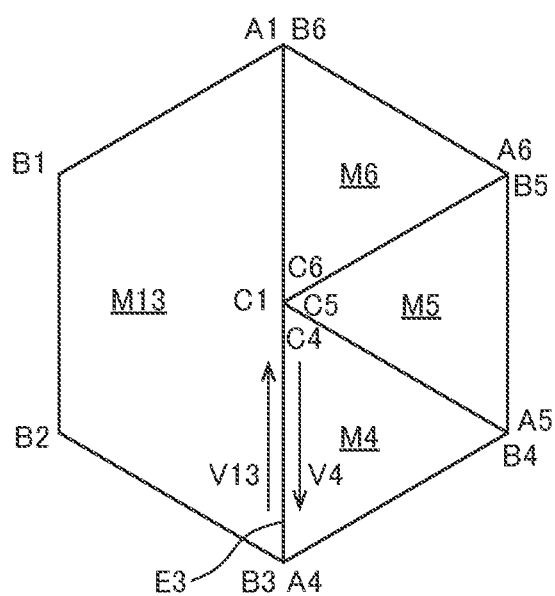

In FIG. 6B, a merged mesh M13 includes: the edge connecting the vertex A1 and the vertex B1 together; the edge connecting the vertex B1 and the vertex B2 together; an edge connecting the vertex B2 and a vertex B3 together; an edge connecting the vertex B3 and the vertex C1 together; and the edge connecting the vertex C1 and the vertex A1 together. The edge connecting the vertex B3 and the vertex C1 together and the edge connecting the vertex C1 and the vertex A1 together are aligned in a straight line. However, the processing unit 212 handles the lines as different lines.

FIG. 6B is an exemplary view of a triangular mesh in FIG. 6A with a vector defined. A vector V13 of the merged mesh M13 connects the vertex B3 and the vertex C1 together. A vector V4 of a triangular mesh M4 connects a vertex C4 and a vertex A4 together. The starting point of the vector V13 and the ending point of the vector V4 are the same, and the vector V13 and the vector V4 are oriented in opposite directions. Moreover, the difference is assumed to be within a certain range between the orientation of the normal vector of the merged mesh M13 and the orientation of the normal vector of the triangular mesh M4.

The processing unit 212 deletes an edge E3 on which the vector V13 and the vector V4 overlap with each other, and merges the merged mesh M13 and the triangular mesh M4 together. Hence, the processing unit 212 repeats the processing to merge a triangular mesh into a merged mesh.

Figure 7A:
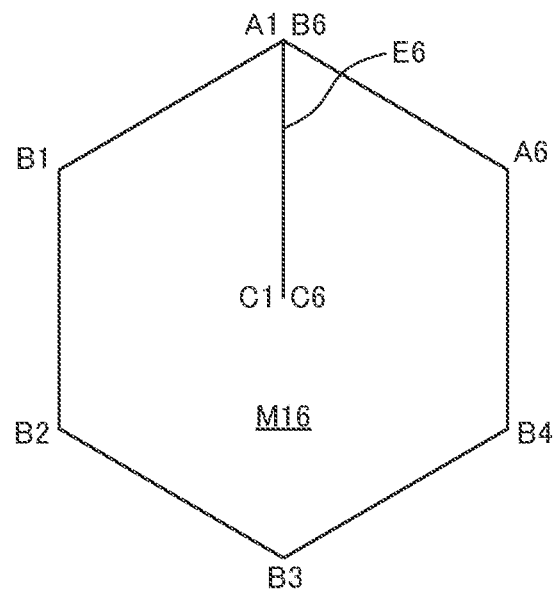
FIG. 7A is an exemplary view of the merged mesh with the last edge left.

FIG. 7A is an exemplary view of the merged mesh with the last edge left. The vertex A1 and a vertex B6 are the same point. The vectors connecting the vertices A1, B1, B2, B3, B4, B5, and B6 together can be connected together. In such a case, the processing unit 212 connects the vectors together, and deletes the last edge E6 left inside a region defined by the vectors.

Figure 7B:
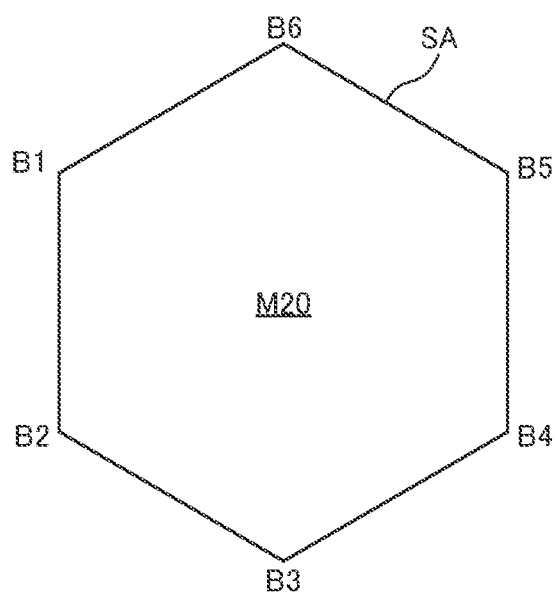
FIG. 7B is an exemplary view of an outline of a plane obtained when the triangular meshes are merged together.

FIG. 7B is an exemplary view of an outermost outline of a plane obtained when the triangular meshes are merged together. In FIG. 7B, a merged mesh M20 is obtained when the above edge E6 is deleted. The vectors of the merged mesh M20 are connected together to define a region, and the region represents a plane of the outermost outline of the object. In the example of FIG. 7B, a plane SA represents a plane of the outermost outline of the object.

From the merged mesh M20, the plurality of edges that have defined the triangular meshes M1 to M6 are deleted. This processing deletes much information on the triangular meshes representing one plane of the object, thereby reducing information representing a shape of the object OB. The reduced information contributes to reduction in processing time for analyzing the shape of the object OB.

Figure 8A:
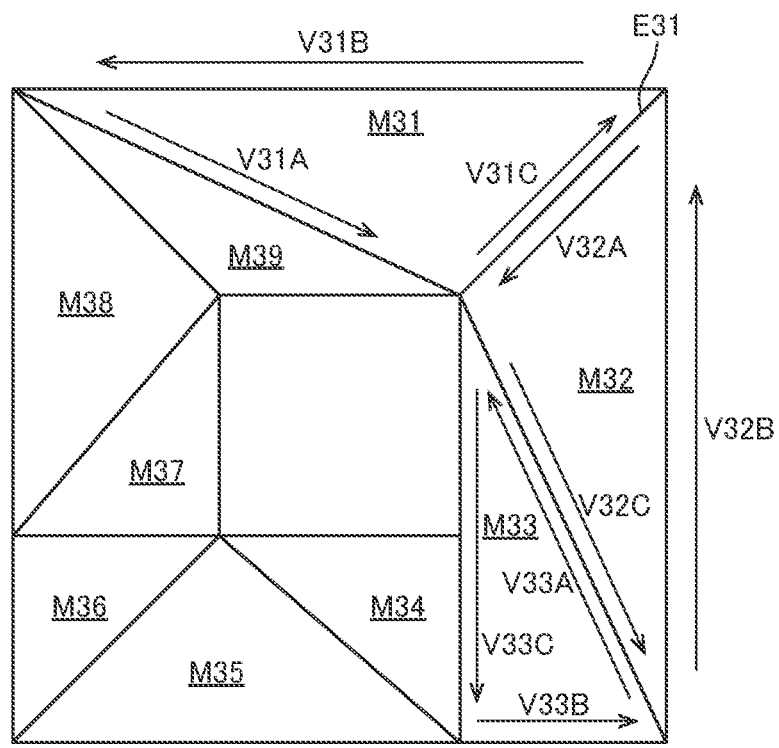
FIG. 8A is an exemplary view of nine triangular meshes.

Next, if there is a hole in a plane, how to merge the meshes and analyze the hole will be described with reference to FIGS. 8A to 10B. FIG. 8A is an exemplary view of nine triangular meshes. In FIG. 8A, nine triangular meshes M31 to M39 partially represent the mesh data obtained from the server 101 by the obtaining unit 211. The mesh data including the triangular meshes M31 to M39 in FIG. 8A may be the same as, or different from, the mesh data including the triangular meshes M1 to M6 in FIG. 4A.

The processing unit 212 defines three vectors V31A, V31B, and V31C for the triangular mesh M31, as seen in the above example. Likewise, the processing unit 212 defines: three vectors V32A, V32B, and V32C for the triangular mesh M32; and three vectors V33A, V33B, and V33C for the triangular mesh M33.

The starting point of the vector V31C of the triangular mesh M31 is the same as the ending point of the vector V32A of the triangular mesh M32, and the vector V31C and the vector V32A are oriented in opposite directions. Moreover, the difference is assumed to be within a certain range between the orientation of the normal vector of the triangular mesh M31 and the orientation of the normal vector of the triangular mesh M32.

Figure 8B:
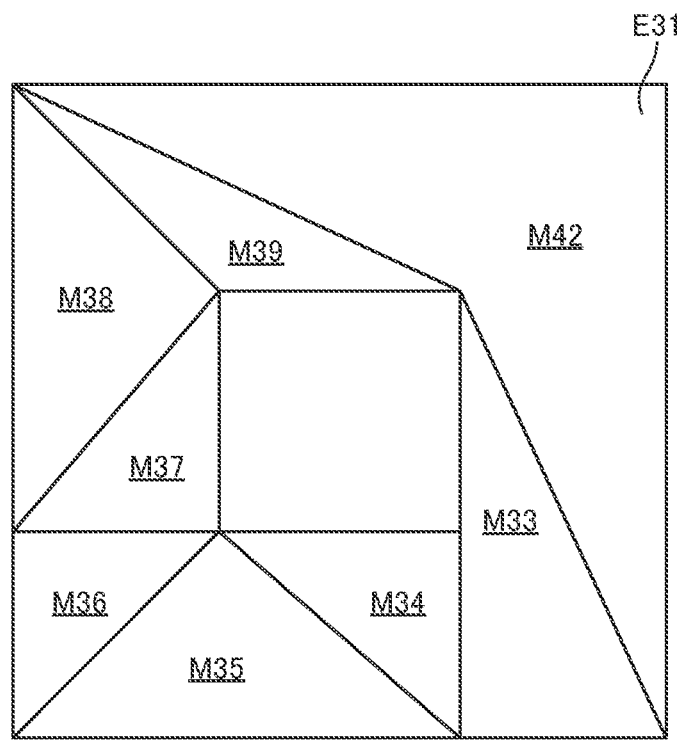
FIG. 8B is an exemplary view showing that two of the triangular meshes in FIG. 8A are merged.

The processing unit 212 deletes an edge E31 on which the vector V31C and the vector V32A overlap with each other, and merges the triangular mesh M31 and the triangular mesh M32 together. FIG. 8B is an exemplary view showing that two of the triangular meshes in FIG. 8A are merged together. The triangular mesh M31 and the triangular mesh M32 are merged together, such that a merged mesh M42 is obtained.

Figure 9A:
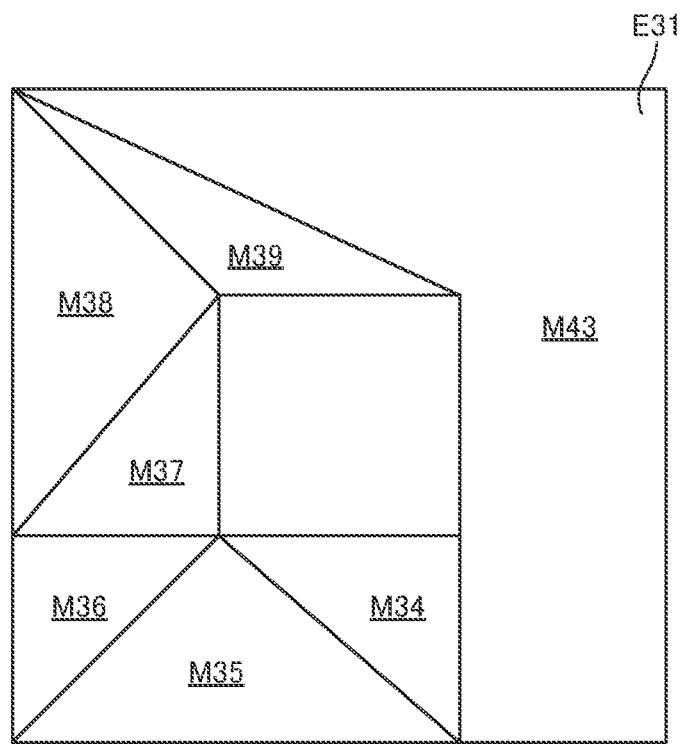
FIG. 9A is an exemplary view showing that a triangular mesh is merged into the merged mesh in FIG. 9B is another exemplary view of the merged mesh with the last edge left.

Likewise, the processing unit 212 deletes an edge E32 on which the vector V32C of the merged mesh M42 and the vector V33A of the triangular mesh M33 overlap with each other, and merges the merged mesh M42 and the triangular mesh M33 together. FIG. 9A is an exemplary view showing that a triangular mesh is merged into the merged mesh in FIG. 8B. In the example of FIG. 9A, the merged mesh M42 and the triangular mesh M33 are merged together to form a merged mesh M43.

If there is a triangular mesh that shares an edge with a merged mesh and that has a normal vector whose orientation is within a certain range, the processing unit 212 repeatedly performs processing to merge the merged mesh and the triangular mesh together. Hence, a merged mesh M49 is obtained as seen in the example of FIG. 9B.

Figure 9B:
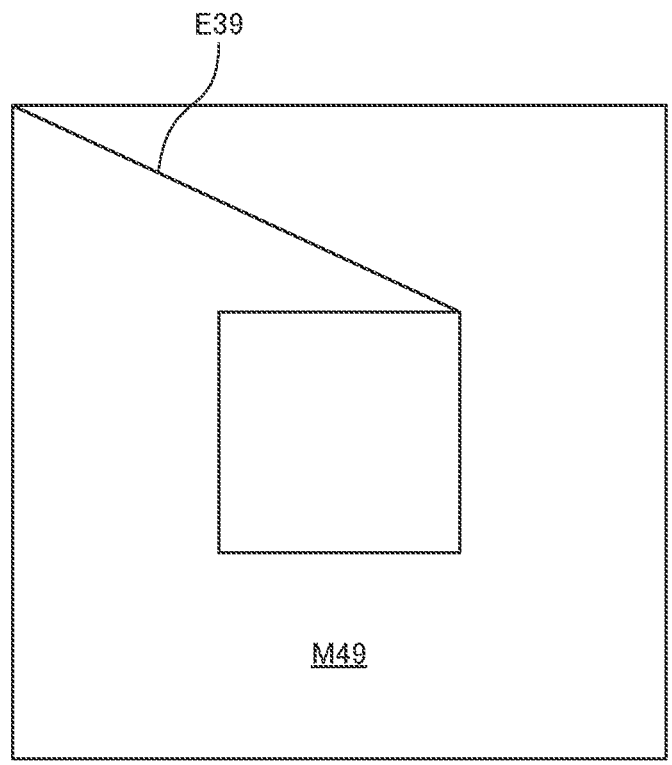

FIG. 9B is an exemplary view of the merged mesh M49 with the last edge left. The processing unit 212 deletes a last edge E39 from the merged mesh M49. The vectors of the merged mesh M49 connect together to define a region, and the region represents a plane (the plane SB of FIG. 10) of the outermost outline of the object.

Figure 10:
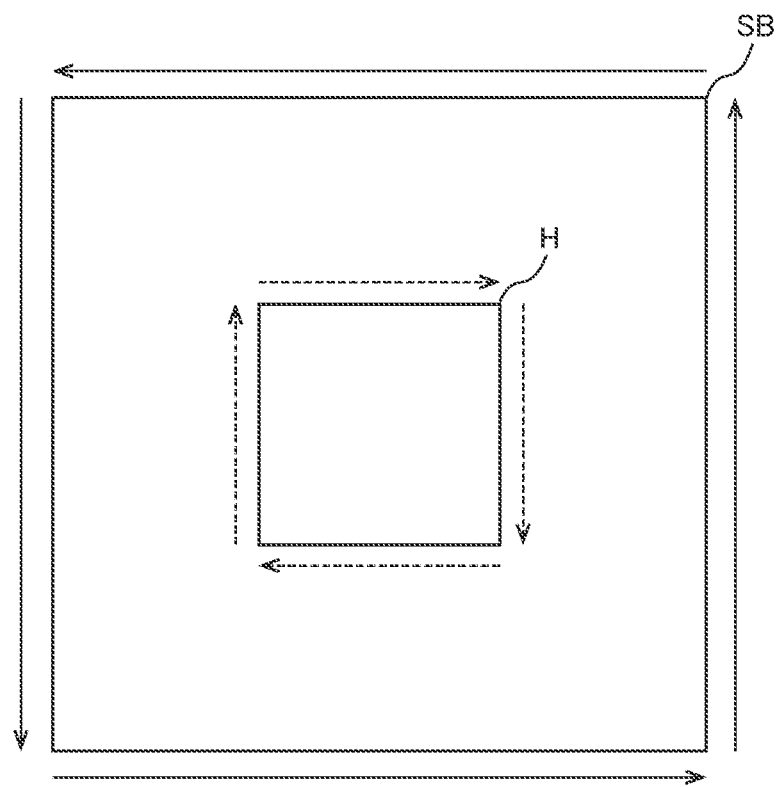
FIG. 10 is an exemplary view showing that, inside a region of a plane of an object, there is another region.

FIG. 10 is an exemplary view showing that, inside a region of a plane of an object, there is another region. The vectors defining the outline of the plane SB are vectors of triangular meshes included in the triangular meshes in FIG. 8A. As described above, all the vectors of three edges for each of the triangular meshes are defined counterclockwise. Hence, all the vectors defining the outline of the plane SB are defined counterclockwise.

Meanwhile, as seen in the example of FIG. 10, there is another region inside the plane SB. Each of the vectors, indicated by broken lines that define the other region, is defined clockwise. In such a case, the processing unit 212 determines that the other region is a hole H provided inside the plane SB.

For example, the vector V33C in FIG. 8A is partially included in an edge of the hole H. With respect to the hole H, the vector V33C in FIG. 8A is defined clockwise. Hence, all the vectors defining the hole H are arranged clockwise. That is, the vectors defining the plane SB and the vectors defining the hole H are oriented in opposite directions.

If there is another region inside the plane SB and the vectors defining the other region are oriented clockwise, the processing unit 212 determines that the other region is a hole. Hence, the analyzing unit 213 analyzes that a hole is formed on one of a plurality of outer planes representing the object OB.

Figure 11:
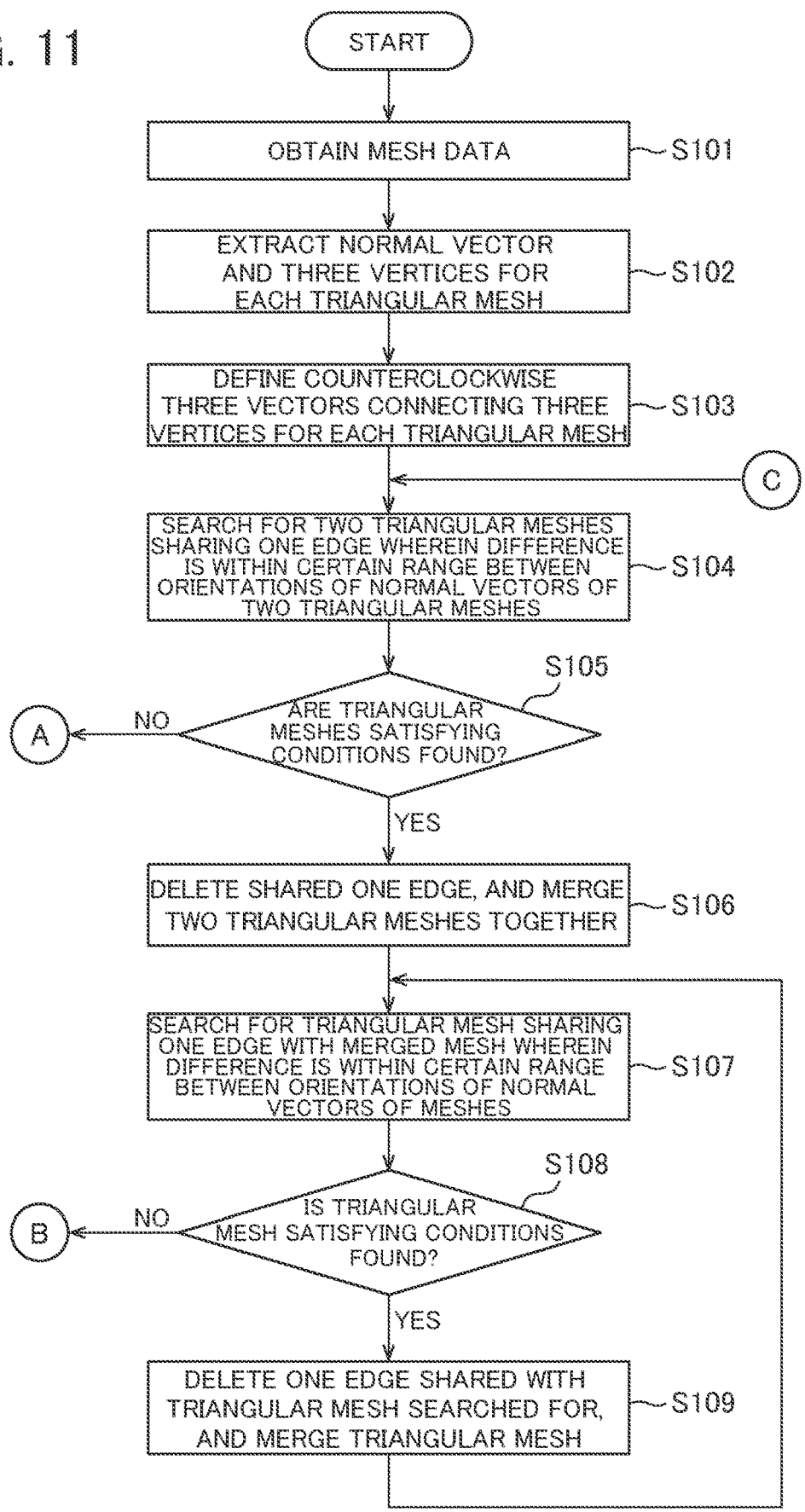
FIG. 11 is a flowchart showing an exemplary sequence of processing in this embodiment.

Described next is a sequence of processing in this embodiment. FIG. 11 is a flowchart showing an exemplary sequence of the processing in this embodiment. The obtaining unit 211 causes the communicating unit 202 to obtain mesh data from the server 101 through the network NW (Step S101). The obtained mesh data is STL data representing an object with a plurality of triangular meshes.

For each of the plurality of triangular meshes included in the mesh data, the processing unit 212 extracts a normal vector and three vertices (Step S102). Then, the processing unit 212 arranges counterclockwise the three vertices for each of the triangular meshes, and defines counterclockwise three vectors connecting the three vertices for each of the triangular meshes (Step S103).

At Step S103, the processing unit 212 may define clockwise three vectors connecting three vertices for all the triangular meshes. In such a case, the vectors for determining the above hole are oriented in the opposite direction (oriented counterclockwise).

The processing unit 212 searches the plurality of triangular meshes for two triangular meshes (Step S104). The two triangular meshes share one edge, and a difference is within a certain range between orientations of normal vectors of the two triangular meshes. Here, if a starting point of a vector of one of the two triangular meshes and an ending point of a vector of another one of the two triangular meshes are the same, and if the vectors are oriented in opposite directions, the processing unit 212 determines that the two triangular meshes share the one edge.

As a result of the search under the conditions at Step S104, the processing unit 212 determines whether the two triangular meshes satisfying the conditions are found (Step S105). If there is no triangular mesh satisfying the search conditions at Step S104 among the plurality of triangular meshes included in the obtained mesh data, the processing unit 212 determines NO at Step S105. In such a case, the processing of the processing unit 212 proceeds from "A" to "A" in FIG. 12. The processing in the flowchart ends.

If the triangular meshes satisfying the search conditions at Step S104 are found among the plurality of triangular meshes included in the obtained mesh data, the processing unit 212 determines YES at Step S105. The processing proceeds to Step S106.

The mesh data obtained from the server 101 includes many triangular meshes. Then, it is assumed that there would be many triangular meshes satisfying the search conditions (i.e., one edge is shared, and the difference is within a certain range between the orientations of the normal vectors) at Step S104. In such a case, the processing unit 212 may designate any given two triangular meshes satisfying the search conditions, from among the many triangular meshes included in the mesh data.

The processing unit 212 deletes one edge shared between the two triangular meshes satisfying the conditions, and merges the two triangular meshes together (Step S106). Hence, the triangular meshes are merged together, such that a merged mesh is obtained. If a difference is found between orientations of normal vectors of the two triangular meshes before the merger, the processing unit 212 defines, as a normal vector of the merged mesh, an average of the orientations of the normal vectors of the two triangular meshes before the merger.

The processing unit 212 searches for a triangular mesh (Step S107). The triangular mesh shares one edge with the merged mesh, and a difference is within a certain range between orientations of normal vectors of the meshes. The merged mesh includes two kinds of meshes: a mesh into which two triangular meshes are merged; and a mesh formed of a merged mesh and another triangular mesh additionally merged into the merged mesh.

As a result of the search under the conditions at Step S107, the processing unit 212 determines whether the triangular mesh satisfying the conditions is found (Step S108). If the triangular mesh satisfying the search condition at Step S108 is found, the processing unit 212 determines YES at Step S108. The processing proceeds to Step S109.

The processing unit 212 deletes the one edge shared between the triangular mesh searched for and the merged mesh, and merges the triangular mesh into the merged mesh (Step S109).

The processing unit 212 executes Step S109. After that, the processing returns to Step S107. Hence, the processing unit 212 repeatedly merges, into the merged mesh, a triangular mesh satisfying the search conditions at Step S107.

As to the merged mesh, when there are no more remaining triangular meshes satisfying the search conditions at Step S107, the processing unit 212 determines NO at Step S108. The processing proceeds from "B" to Step S110 in FIG. 11.

Figure 12:
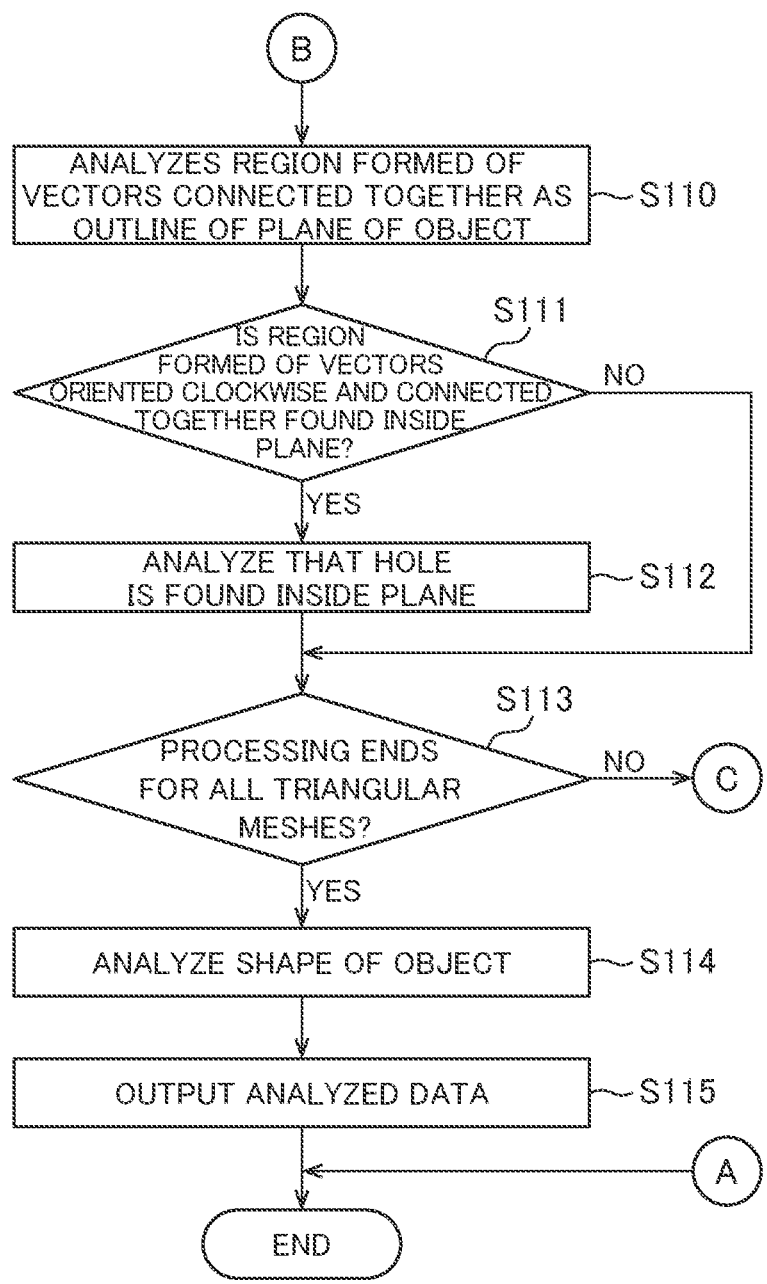
FIG. 12 is a flowchart following.

FIG. 12 is a flowchart following FIG. 11. The analyzing unit 213 analyzes a region formed of a plurality of vectors connected together as an outline of one plane of the object OB (Step S110). For example, the analyzing unit 213 analyzes, as an outline of one plane of the object OB, a region formed of six vectors connected together for the mesh M20 in FIG. 7B.

The analyzing unit 213 determines whether a region (another region) is found inside the plane analyzed at Step S110 (Step S111). The other region is formed of vectors oriented clockwise and connected together. If the other region, formed of the vectors oriented clockwise and connected together, is found inside the above plane, the analyzing unit 213 determines YES at Step S111. The processing proceeds to Step S112. In such a case, the analyzing unit 213 analyses that the above other region is a hole formed inside the above plane (Step S112).

As described above, if another region is found inside a plane, the vectors defining the other region are oriented clockwise. Hence, if another region is found inside a plane, and the vectors defining the other region are oriented counterclockwise (if the vectors are oriented in the same directions as the vectors defined at Step S103), the analyzing unit 213 may determine that some kind of error is produced. An example of the error includes miscalculation. In such a case, the analyzing unit 213 may, for example, cause the display unit 205 to display information on the produced error.

Steps S104 to S112 are executed, such that the processing to merge the triangular meshes for one plane ends. Because the object OB has a three-dimensional shape, the processing might be left with a merger of triangular meshes for another plane.

The processing unit 212 determines whether the processing (merging triangular meshes together) ends for all the triangular meshes included in the mesh data (Step S113). If the processing does not end for all the triangular meshes, the processing unit 212 determines NO at Step S113. The processing returns from "C" to Step S104 in FIG. 11. In such a case, Steps S104 to S112 are repeated for another plane.

Steps S104 to S112 are repeatedly executed, such that information is obtained on a plurality of planes representing the object. Step S104 to S112 may be executed either in sequence or in parallel.

When the processing ends for all the triangular meshes, the processing unit 212 determines YES at Step S113. The processing proceeds to Step S114. Hence, the processing ends for all the triangular meshes included in the mesh data.

Figure 13:
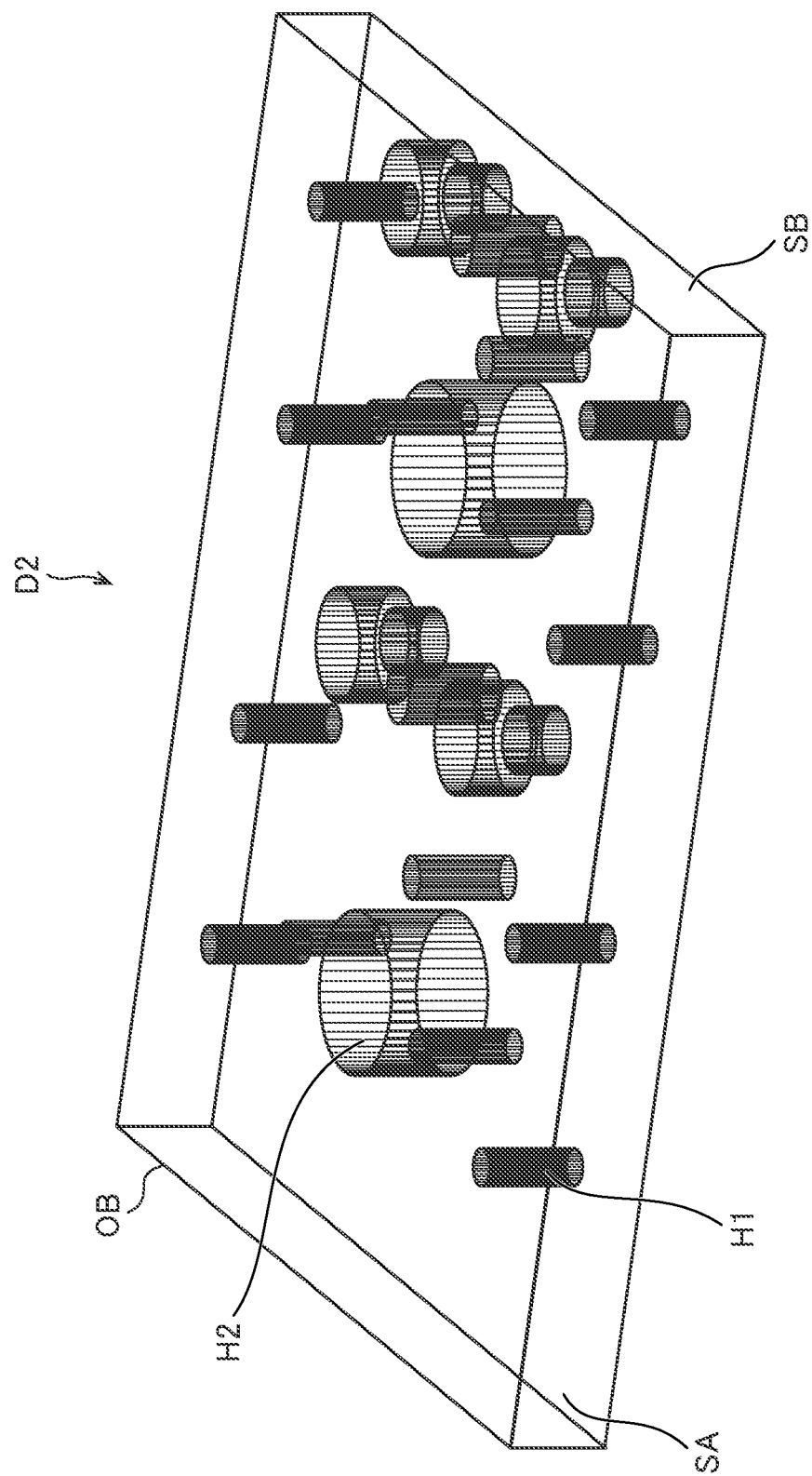
FIG. 13 is an exemplary view of mesh data after processing.

FIG. 13 is an exemplary view of mesh data after processing. The exemplary data shown in FIG. 13 and representing the object OB is the exemplary data shown in FIG. 3 and representing the object OB while triangular meshes are significantly deleted from the data.

The analyzing unit 213 analyzes a shape of the object OB included the mesh data after the processing (Step S114). From the mesh data of this embodiment after the processing, information on many triangular meshes has been deleted. Such a feature contributes to reduction in time for analyzing the shape of object OB.

For example, the mesh data illustrated in FIG. 3 includes many triangular meshes on the side planes SA and SB of the object OB. Whereas, the mesh data illustrated in FIG. 13 leaves information on the edges defining the outlines of the side planes SA and SB, while information on unnecessary triangular meshes is deleted. Such a feature can significantly reduce the amount of information on the mesh data, thereby contributing to significant reduction in time for analyzing the shape of the object OB.

The analyzing unit 213, for example, analyzes the shape by scanning each of the layers of the three-dimensional shape of the object OB. The layers are layered vertically at fine granularity. For example, the shape is analyzed at a resolution of 1 μm, and layered into approximately 20000 layers. In such a case, compared with a case where the processing of this embodiment is not executed, if the processing of this embodiment is executed, the time required for the data analysis can be reduced to approximately one-tenth.

Moreover, in the mesh data exemplified in FIG. 3, the edges of the outline of the object OB are represented by a plurality of triangular meshes. Hence, the edges of the outline of the object OB are discontinuous edges connected together. In the example of FIG. 3, the side planes SA and SB of the object OB are represented by many triangular meshes. The side planes SA and SB include many discontinuous edges. Such discontinuous edges make it difficult to determine the outline of the object OB.

For example, the machine tool 103 performs welding and burring on the object OB. In performing such processing, the edges of the outline of the object OB have to be determined highly precisely. In particular, when the processing with the machine tool 103 is automated, it is important to highly precisely determine the edges of the outline of the object OB.

In this embodiment, as illustrated in the example of FIG. 13, information on many triangular meshes is deleted from the object OB. An edge of the outline of the object OB is represented by one edge. Such a feature allows the machine tool 103 to perform automated processing, using the data representing the object OB and subjected to the processing of this embodiment. Moreover, from the mesh data in FIG. 13, the information on many triangular meshes is deleted. Hence, even if the hole H1 and the hole H2 have a side hole, the presence of the side hole can be easily analyzed.

The output unit 214 outputs analyzed data obtained by the analysis of the mesh data and representing the shape of the object OB (Step S114). For example, the output unit 214 outputs a result of the analysis to the setting apparatus 105.

In accordance with the analysis result, the setting apparatus 105 determines, for example, various settings such as selecting a processing type and a tool. If the shape analysis apparatus 104 and the setting apparatus 105 are provided in the form of a single apparatus, the above analysis result is output to, for example, a software module determining various settings such as selecting a processing type and a tool.

The above analyzed data may be output to the display unit 205. The display unit 205 displays the simple mesh data represented in the example of FIG. 13. Hence, a user operating the shape analysis apparatus 104 can view not mesh data represented by many triangular meshes as seen in the example of FIG. 3, but simple mesh data. Thanks to such a feature, the user can successfully identify the shape of the object OB.

As can be seen, this embodiment involves merging triangular meshes sharing one edge and having normal vectors within a certain range, among a plurality of triangular meshes included in mesh data representing an object. Such a feature reduces the amount of information on the triangular meshes included in the mesh data, thereby contributing to reduction in time required for analysis of the object.

Note that, as can be seen, this embodiment has been described in detail. Those skilled in the art will readily understand that various modifications are possible unless otherwise substantially departing from new matters and advantageous effects of this embodiment. Hence, the various modifications shall be included in the scope of the present disclosure. For example, if a term is used at least once along with a different term having a broader sense than the term has, or a different term that is a synonym with the term, the term can be replaced with the different term in any portion of the Specification or the drawings. Moreover, all the combinations of this embodiment and modifications shall be included in the scope of the present disclosure.

What is claimed is:

1. A shape analysis apparatus comprising one or more processors configured to:
   obtain mesh data representing a shape of an object, using a plurality of triangular meshes;
   perform processing of: merging two of the plurality of triangular meshes together, the two triangular meshes sharing one edge, and a difference in orientation being within a certain range between normal vectors of the two triangular meshes; and repeatedly merging a triangular mesh included in the plurality of triangular meshes, the triangular mesh sharing one edge with the merged meshes, and a difference in orientation being within a certain range between normal vectors of the triangular mesh and the merged meshes;
   analyze shape data representing the shape of the object, in accordance with a result of the processing performed by the one or more processors; and
   define, either clockwise or counterclockwise, a direction of three vectors connecting three vertices of each of the plurality of triangular meshes.

2. The shape analysis apparatus according to claim 1, wherein the one or more processors are further configured to delete, as the one edge, a line segment defined by two vectors, a starting point of one of the two vectors being same as an ending point of another one of the two vectors, and the two vectors being oriented in opposite directions.

3. The shape analysis apparatus according to claim 1, wherein the one or more processors are further configured to analyze that a region, which is formed by connecting a vector in a same direction as the direction in which the three vectors are defined, is one plane of an outermost outline of the object.

4. The shape analysis apparatus according to claim 3, wherein, when there is an other region inside the region, the one or more processors are further configured to analyze that the other region is a hole provided inside the object, the other region being formed of a plurality of vectors connected together and oriented in a direction opposite to the direction in which the three vectors are defined.

5. The shape analysis apparatus according to claim 1, wherein the one or more processors are further configured to
   finish the processing of the repeated merger when there is no other triangular mesh to be merged in the mesh data, and
   output, as the shape data, data that is the mesh data on which the one or more processors finishes the processing of the repeated merger.

6. A shape analysis method processing of which is executed by a computer, the shape analysis method comprising:
   obtaining mesh data representing a shape of an object, using a plurality of triangular meshes;
   performing processing of: merging two of the plurality of triangular meshes together, the two triangular meshes sharing one edge, and a difference in orientation being within a certain range between normal vectors of the two triangular meshes; and repeatedly merging a triangular mesh included in the plurality of triangular meshes, the triangular mesh sharing one edge with the merged meshes, and a difference in orientation being within a certain range between normal vectors of the triangular mesh and the merged meshes;

analyzing shape data representing the shape of the object, in accordance with a result of the processing of the repeated merger; and defining, either clockwise or counterclockwise, a direction of three vectors connecting three vertices of each of the plurality of triangular meshes.

7. A non-transitory computer-readable storage medium, for shape analysis, causing a computer to execute processing of:

obtaining mesh data representing a shape of an object, using a plurality of triangular meshes;

performing processing of: merging two of the plurality of triangular meshes together, the two triangular meshes sharing one edge, and a difference in orientation being within a certain range between normal vectors of the two triangular meshes; and repeatedly merging a triangular mesh included in the plurality of triangular meshes, the triangular mesh sharing one edge with the merged meshes, and a difference in orientation being within a certain range between normal vectors of the triangular mesh and the merged meshes;

analyzing shape data representing the shape of the object, in accordance with a result of the processing of the repeated merger; and defining, either clockwise or counterclockwise, a direction of three vectors connecting three vertices of each of the plurality of triangular meshes.

* * * * *